(12) United States Patent
Sun et al.

(10) Patent No.: US 12,479,967 B2
(45) Date of Patent: Nov. 25, 2025

(54) THERMALLY INSULATING AEROGEL VACUUM COMPOSITE PANEL AND PREPARATION METHOD THEREOF

(71) Applicants: Huabao (Tianjin) New Material Science And Technology Development Co., Ltd., Tianjin (CN); Shanxi Huabao New Materials Co., Ltd., Shanxi (CN)

(72) Inventors: Ye Sun, Tianjin (CN); Pei Jiang, Tianjin (CN); Na Wu, Tianjin (CN); Jianwei Chen, Tianjin (CN); Peng Liu, Tianjin (CN); Fengxiang Bai, Tianjin (CN); Lianshan Han, Tianjin (CN); Jianlong Wang, Tianjin (CN); Jia Wang, Tianjin (CN); Dinghao Zhang, Tianjin (CN); Dingxin Zhang, Tianjin (CN)

(73) Assignees: Huabao (Tianjin) New Material Science And Technology Development Co., Ltd., Tianjin (CN); Shanxi Huabao New Materials Co., Ltd., Shanxi (CN)

( * ) Notice: Subject to any disclaimer, the term of this patent is extended or adjusted under 35 U.S.C. 154(b) by 776 days.

(21) Appl. No.: 17/738,439

(22) Filed: May 6, 2022

(65) Prior Publication Data
US 2022/0275164 A1 Sep. 1, 2022

Related U.S. Application Data

(63) Continuation of application No. PCT/CN2021/074129, filed on Jan. 28, 2021.

(51) Int. Cl.
| | | |
|---|---|---|
| C01B 33/154 | (2006.01) | |
| C08J 9/28 | (2006.01) | |
| C08K 3/22 | (2006.01) | |
| C08K 3/36 | (2006.01) | |
| E04B 1/80 | (2006.01) | |
| E04B 1/74 | (2006.01) | |

(52) U.S. Cl.
CPC .............. *C08J 9/283* (2013.01); *C01B 33/154* (2013.01); *C08K 3/22* (2013.01); *C08K 3/36* (2013.01); *E04B 1/803* (2013.01); *C08J 2201/0504* (2013.01); *C08J 2205/026* (2013.01); *C08J 2383/04* (2013.01); *C08K 2003/2227* (2013.01); *E04B 2001/748* (2013.01)

(58) Field of Classification Search
CPC .. C01B 33/00; C01B 33/154; C08J 2205/026; F16L 59/02
See application file for complete search history.

(56) References Cited

U.S. PATENT DOCUMENTS

| | | | |
|---|---|---|---|
| 2014/0221699 A1* | 8/2014 | Szeifert | ................. C01B 33/155 |
| | | | 568/840 |
| 2018/0094114 A1* | 4/2018 | Evans | ....................... C08K 3/36 |
| 2019/0143400 A1* | 5/2019 | Golfetto | ................... B01D 3/00 |
| | | | 164/34 |

FOREIGN PATENT DOCUMENTS

| | | | | |
|---|---|---|---|---|
| CN | 103241391 A | | 8/2013 | |
| CN | 104446306 | * | 8/2016 | ............. C04B 28/24 |
| CN | 106629822 A | | 5/2017 | |
| CN | 206328993 U | | 7/2017 | |
| CN | 108584965 | * | 9/2018 | ........... C01B 33/158 |
| CN | 108940139 A | | 12/2018 | |
| CN | 109560269 A | | 4/2019 | |
| CN | 109629986 A | | 4/2019 | |
| CN | 111635175 A | | 9/2020 | |
| KR | 1020150005858 | * | 1/2015 | ............. B04C 2/284 |
| WO | 2009038393 A2 | | 3/2009 | |

OTHER PUBLICATIONS

International Search Report and Written Opinion cited in PCT/CN2021/074129 mailed Oct. 27, 2021, 10 pages.

* cited by examiner

*Primary Examiner* — Alison L Hindenlang
*Assistant Examiner* — Debjani Roy
(74) *Attorney, Agent, or Firm* — Cooper Legal Group, LLC

(57) ABSTRACT

The present application discloses a thermally insulating aerogel vacuum composite panel and a preparation method thereof. The preparation method includes the following steps: (1) mixing TEOS solution and a metal particle, adding a hydrophobic agent, mixing, adding ammonium trifluoroacetate solution dropwise until completely gelating to obtain a metal aerogel precursor; (2) adding the metal aerogel precursor into an acid replacement solution for replacement for 1-24 h to obtain a gel; (3) washing the gel with deionized water to obtain a neutral gel; (4) soaking the neutral gel obtained in step (3) in a first organic resin solvent; (5) pouring the neutral gel into a substrate with honeycomb structure, and aging for re-gelating to obtain a modified panel; (6) drying the modified panel to obtain a honeycomb panel; and (7) aging the honeycomb panel at room temperature for 1-24 h to obtain the vacuum composite panel.

7 Claims, No Drawings

THERMALLY INSULATING AEROGEL VACUUM COMPOSITE PANEL AND PREPARATION METHOD THEREOF

CROSS-REFERENCE TO RELATED APPLICATION

This application is a continuation of PCT application serial no. PCT/CN2021/074129, filed on Jan. 28, 2021, which is incorporated herein by reference in its entirety and made a part of this specification.

TECHNICAL FIELD

The present application relates to the technical field of aerogel composites, and in particular to a thermally insulating aerogel vacuum composite panel and a preparation method thereof.

BACKGROUND ART

An aerogel is usually a lightweight nano solid material having a nano-porous network structure formed by aggregation of nano-scale ultrafine particles and gaseous dispersed medium filled in pores of the nano-porous network structure. The most commonly seen aerogel is a silica aerogel, which is a lightweight nano-porous amorphous solid material with excellent thermal protection and heat-insulation properties.

China patent publication No. CN103241391A discloses a heat-insulation assembly for thermal control of a Mars lander, which includes a thin layer structure, a structural support, a first aerogel block and a second aerogel block made of a silica aerogel composite, a honeycomb and a skin. The honeycomb is filled with the second aerogel block and sandwiched between two layers of skin to form a honeycomb panel. The first aerogel block and the structural support are arranged on a first surface of the honeycomb panel, and an outer surface of the first aerogel block is covered with the thin layer structure.

China Utility Model No. CN206328993U discloses an aerogel honeycomb sandwich panel. The sandwich panel consists of an upper layer and a lower panel and an intermediate aerogel honeycomb core. In particular, the aerogel honeycomb core has a structure in which the aerogel sheet covers the surface of the honeycomb core.

China patent publication No. CN108940139A discloses a honeycomb substrate reinforced aerogel composites, which consists of a honeycomb material penetrating therethrough and an aerogel in the pores of the honeycomb material. The honeycomb material is soaked into a sol to form a wet gel, which is subjected to aging and drying to obtain the honeycomb substrate reinforced aerogel composites. A honeycomb substrate reinforced aerogel composite products are obtained by covering the upper and lower layers of the composites with coating or film or sheet or cloth.

China patent publication No. CN109629986A discloses an aerogel thermally insulating sound-insulation honeycomb composite panel and an assembling device thereof, which includes an assembling block, a positioning block A, a positioning groove, a composite panel B, a positioning block B, a cavity and aerogel particles, and the aerogel particles are arranged in the cavity of the composite panel A and the composite panel B.

In the above related technologies, either silica gel aerogel blocks or aerogel particles are filled in the honeycomb panel or covered the honeycomb panel with an aerogel cloth. After the aerogel is broken into powder, the pores of the aerogel is destroyed, and the contact gap between the particles and the particles is larger than that of nanometer level, thus increasing the fluidity of the air and reducing thermally insulating property of the composite panel. At the same time, due to a bad combination between aerogels and panels, a phenomenon of "scaling" is likely to occur. Further, the aerogel cloth only has aerogels on the surface of the honeycomb structure, without enough combination between the aerogels and panels, which reduces the utilization rate of materials and leads to a higher overall thermal conductivity.

SUMMARY

In order to improve a bonding property between an aerogel and a panel, reduce a thermal conductivity of the panel and achieve adjustability of light transmittance, the present application provides a thermally insulating aerogel vacuum composite panel and a preparation method thereof.

In a first aspect, the present application provides a preparation method of a thermally insulating aerogel vacuum composite panel, which adopts the following technical solution:

a preparation method of a thermally insulating aerogel vacuum composite panel, which includes the following steps:
(1) preparation of an aerogel precursor: mixing TEOS solution having a mass concentration of 20-50% with a metal particle by a weight ratio of 100:(20-40), adding a hydrophobic agent having a mass concentration of 0.1-3%, mixing, and adding ammonium trifluoroacetate solution having a mass concentration of 0.1-5% dropwise until completely gelating to obtain a metal aerogel precursor, in which a weight ratio of the TEOS solution to the hydrophobic agent is 100:(1-30);
(2) etching: adding the metal aerogel precursor to an acid replacement solution with a mass concentration of 3-10% for replacement to obtain a gel, with a replacement temperature of 30-60° C., and a replacement time of 1-24 h;
(3) washing: washing the gel obtained in step (2) with deionized water to obtain a neutral gel;
(4) replacing: soaking the neutral gel obtained in step (3) in a first organic resin solvent having a mass concentration of 0.1-5% for 4-8 h;
(5) pouring: homogenizing the gel obtained in step (4), pouring into a substrate with a honeycomb structure, and aging for 4-8 h to obtain a modified panel;
(6) drying the modified panel obtained in step (5) to obtain a honeycomb panel; and
(7) aging the honeycomb panel obtained in step (6) at room temperature for 1-24 h under an absolute vacuum of 0.01-0.05 MPa.

In the above technical solution, silica is replaced by the metal particle to form a jelly-like aerogel precursor, and the aerogel precursor is etched with an acid of pH 3 or lower, so that nano honeycomb pores are formed inside the metal aerogel precursor, which can effectively improve the heat-insulation property of the aerogel. Then, the acid in the pores is washed with deionized water, and the washed neutral aerogel are soaked in the first organic resin solvent having a low concentration. In this case, if it is not replaced with the first organic resin solvent, a large water surface tension will collapse the pores and in turn destroy the honeycomb structure in later drying process. In the above technical solution, by using the first organic resin solvent for replacing, the solvent can replace the water in the honeycomb pores of the metal aerogel, while the organic resin in the solvent will remain in the honeycomb pores of the metal aerogel, so as to support the honeycomb pores in the metal aerogel and prevent the collapse of the honeycomb pores in the metal aerogel.

The metal aerogel is stirred to form a colloid with fluidity, and then poured into the substrate containing a honeycomb structure. In some embodiments, the substrate is a solvent resistant transparent plastic such as PC and PE. Since the aging of the gel before drying will not destroy the honeycomb structure in the metal aerogel, and, instead, reassembling small particles containing honeycomb pores into a large honeycomb structure, the modified panel formed by aging is an aerogel honeycomb panel with double honeycomb structure.

Drying and vacuum compounding the modified panel tightly combines the metal aerogel with the honeycomb panel, thus effectively preventing the phenomenon of scaling during use. After replacement with the first organic resin solvent, the first organic resin solvent plays a wrapping role on the inner wall of the honeycomb pores inside the aerogel, so that the honeycomb pores inside the aerogel are not communicated with each other, therefore, the whole vacuum performance of the vacuum composite panel will not be degraded due to cutting.

Therefore, the preparation method of the present application can effectively improve the utilization rate of the vacuum composite panel, while improving noise reduction function of the silica aerogel and reducing the thermal conductivity of the honeycomb panel.

In the present application, when the mass concentration of TEOS solution is in the range of 20-50%, a honeycomb pore can be formed in metal aerogel. If the concentration of TEOS solution is too low, there will be a small amount of gel, and the honeycomb pores in metal aerogel will have a too large pore size during the subsequent etching process, as well as an increased thermal conductivity. A high concentration of the TEOS solution will lead to a high cost.

Preferably, the modified panel obtained in step (5) is soaked in a second organic resin solvent having a mass concentration of 10-60%, replaced for 12-72 hours, and then dried.

In the above technical solution, in the replacement step of the second organic resin solvent, organic resin gradually enters the honeycomb pore of the metal aerogel, and covers the inner wall of the metal aerogel honeycomb pore, effectively ensuring the honeycomb structure inside the metal aerogel, preventing the honeycomb pore collapse in the drying process, thereby ensuring the thermally insulating performance of the final vacuum composite panel. At the same time, residual water in the metal aerogel honeycomb can be replaced.

Preferably, the modified panel obtained by replacement is sprayed with deionized water until a white film appears on the surface of the modified panel to obtain a white surface modified panel.

In the above technical solution, by the step of extracting the modified panel obtained by replacement with deionized water to wash away the water-soluble solvent, an organic resin forms a protective film on the surface of the modified panel to prevent the organic resin from flowing out of the honeycomb pores, facilitating a next operation, while effectively ensuring a support of the organic resin for the honeycomb pores in metal aerogel and reducing the collapse of the honeycomb pore.

Preferably, the white surface modified panel is re-soaked in a third organic resin solvent having a mass concentration of 15-30%, aged for 1-4 h, and then dried in step (6).

In the above technical solution, by the step of the third organic solvent replacement, the organic resin can further enter the honeycomb pore of the metal aerogel, and effectively support the honeycomb pore of the metal aerogel to prevent the aerogel from collapsing.

Preferably, the organic resin is one of PVB and rosin modified alkyd resin; and the solvent is one of ethanol, ethyl acetate, isopropanol and acetone.

Preferably, the metal particle in step (1) is one of nano aluminum particle, nano alumina particle, nano iron particle, nano iron oxide particle, nano tin particle and nano tin oxide particle.

Preferably, the hydrophobic agent in step (1) is one of polysiloxane and polysilazane.

Preferably, the acid in step (2) is one of trifluoroacetic acid, hydrofluoric acid, acetic acid, sulfuric acid, nitric acid and hydrochloric acid.

In the above technical solution, in step (2), trifluoroacetic acid, hydrofluoric acid, acetic acid, sulfuric acid, nitric acid or hydrochloric acid is used to etch the metal particle, so as to form honeycomb pores inside the aerogel. At the same time, in step (1), when using ammonium trifluoroacetate as a catalyst, ammonium trifluoroacetate is hydrolyzed to form free ammonium ion and trifluoroacetate ion, and the trifluoroacetate ion is bonded to a hydroxyl silicon formed by the hydrolysis of tetraethyl orthosilicate, replacing some or all the hydroxyl groups to form a F—C—O—Si bond, thereby forming a protective layer on the surface of the metal aerogel. Therefore, when using hydrofluoric acid as the replacement solution, hydrofluoric acid will not react with the Si—O group, and the grafting of F—C bonds will provide the aerogel with good oil repellent effect.

Preferably, in step (6), the modified panel is dried by supercritical drying under a supercritical pressure of 5-12 MPa at a drying temperature of 30-100° C. for 5-24 h, with a carbon dioxide flow of 0.2-2 L/h.

In the above technical solution, when drying with carbon dioxide, the ethanol solvent in the metal aerogel can be removed by replacement.

In a second aspect, the present application provides a cuttable vacuum composite panel with super thermally insulating aerogel double-layer honeycomb prepared by the above preparation method.

In the above technical solution, by coating the surface of the vacuum composite panel obtained in the present application with hot melt adhesive, and the multi-layer vacuum panel can be made by the means of hot pressing bonding, or the aluminum foil or polyimide film can be made by the means of hot pressing bonding on one or both sides of the vacuum panel, which can be widely used in construction, military industry, industry and other industries.

To sum up, the present application has the following beneficial effects.

1. In this application, the metal particle is partially or completely removed after replacement, thus to form nano honeycomb in the aerogel. The organic resin enters the aerogel honeycomb, and effectively supports the honeycomb pores in the aerogel, effectively preventing the collapse of the honeycomb pores. A double honeycomb composite panel can be formed by compounding the aerogel and honeycomb substrate, so as to reduce the thermal conductivity of the composite panel. In addition, the composite panel formed by vacuum compounding the aerogel and the panel can be cut, after which the vacuum degree of the entire panel will not be degraded, thus effectively ensuring the insulation performance of the panel.

2. In the present application, the aerogel is poured into the substrate to form an organic whole. In a vacuum state, there is a small number of gas molecules in the gel, or no gas molecules, therefore, the aerogel structure will not be damaged after compression due to the increase of internal gas, providing a high compression strength. The vacuum composite panel has good transparency, good visible light transmittance and uniform distribution of nano pores in the panel.

DETAILED DESCRIPTION

The present application will be further described in detail below in combination with examples and Comparison Examples.

The sources of raw materials in the following examples and Comparison Examples are as follow:

PVB resin was purchased from Tianjin ZHONGXIN Chemtech Co., Ltd;

Rosin modified alkyd resin was purchased from Guangde badshi Chemical Co., Ltd; and The substrate, which is a PC honeycomb panel, was purchased from Foshan Baipu New Material Technology Co., Ltd.

In the present application, the solvent of TEOS solution is ethanol; the solvent of ammonium trifluoroacetate solution is the mixture of ethanol and water, in particular, the volume ratio of ethanol to water is 1:1.

Example 1

A preparation method of a thermally insulating aerogel vacuum composite panel included the following steps:
(1) preparation of an aerogel precursor: 1000 g TEOS solution having a mass concentration of 20% and 350 g nano aluminum particles were mixed, then added with 10 g polysiloxane having a mass concentration of 0.1% under stirring, and then added with ammonium trifluoroacetate solution having a mass concentration of 0.5% dropwise until completely gelating to obtain a metal aerogel precursor;
(2) etching: the metal aerogel precursor was added in acetic acid replacement solution having a mass concentration of 10% and replaced at a replacement temperature of 35° C. for 24 h;
(3) washing: the gel obtained in step (2) was washed with deionized water to obtained a neutral gel;
(4) replacement: the neutral gel obtained in step (3) was soaked in ethanol containing 0.1% PVB for 4 h;
(5) pouring: the gel obtained in step (4) was evenly dispersed, and poured into a substrate having a honeycomb structure, and aged for 5 h to obtain a modified panel;
(6) drying: the modified panel obtained in step (5) was dried at 30° C. under a supercritical pressure of 5 MPa for 24 h, in which the carbon dioxide flow rate was 2 L/h; and
(7) aging: the honeycomb panel obtained in step (6) was transferred to a vacuum compounding system, and aged at room temperature under an absolute vacuum degree of 0.01 MPa for 1 h to obtain the vacuum panel.

Example 2

A preparation method of a thermally insulating aerogel vacuum composite panel included the following steps:
(1) preparation of an aerogel precursor: 1000 g TEOS solution having a mass concentration of 50% and 300 g nano iron particles were mixed, then added with 200 g polysiloxane having a mass concentration of 0.5% under stirring, and then added with ammonium trifluoroacetate solution having a mass concentration of 2% dropwise until completely gelating to obtain a metal aerogel precursor;
(2) etching: the metal aerogel precursor was added in trifluoroacetic acid replacement solution having a mass concentration of 5%, and replaced at a replacement temperature of 30° C. for 18 h;
(3) washing: the gel obtained in step (2) was washed with deionized water to obtained a neutral gel;
(4) replacement: the neutral gel obtained in step (3) was soaked in acetone containing 2.8% PVB for 5 h;
(5) pouring: the gel obtained in step (4) was dispersed evenly, and poured into a substrate having honeycomb structure, and aged for 5 h to obtain a modified panel;
(6) drying: the modified panel obtained in step (5) was dried at 50° C. under a supercritical pressure of 6 MPa for 18 h, in which the carbon dioxide flow rate was 1.8 L/h; and
(7) aging: the honeycomb panel obtained in step (6) was transferred to a vacuum composite system, and aged at room temperature under an absolute vacuum degree of 0.03 MPa for 10 h to obtain the vacuum panel.

Example 3

A preparation method of a thermally insulating aerogel vacuum composite panel included the following steps:
(1) preparation of an aerogel precursor: 1000 g TEOS solution having a mass concentration of 40% and 250 g nano alumina particles were mixed, then added with 300 g hydrophobic agent having a mass concentration of 1% under stirring, and then added with ammonium trifluoroacetate solution having a mass concentration of 1% until completely gelating to obtain a metal aerogel precursor;
(2) etching: the metal aerogel precursor was added in hydrofluoric acid replacement solution having a mass concentration of 8%, and replaced at a replacement temperature of 50° C. for 15 h to obtain a gel;
(3) washing: the gel obtained in step (2) was washed with deionized water to obtained a neutral gel;
(4) replacement: the neutral gel obtained in step (3) was soaked in ethanol containing 1% PVB for 6 h;
(5) pouring: the gel obtained in step (4) was evenly dispersed, and poured into a substrate having a honeycomb structure, and aged for 4 h to obtain a modified panel;
(6) drying: the modified panel obtained in step (5) was dried at 60° C. under a supercritical pressure of 8 MPa for 12 h, in which the carbon dioxide flow rate was 1.0 L/h; and
(7) aging: the honeycomb panel obtained in step (6) was transferred to the vacuum composite system, and aged at room temperature under an absolute vacuum degree of 0.05 MPa for 24 h to obtain the vacuum panel.

Example 4

A preparation method of a thermally insulating aerogel vacuum composite panel included the following steps:
(1) preparation of an aerogel precursor: 1000 g TEOS solution having a mass concentration of 30% and 300 g nano iron oxide particles were mixed, then added with 150 g polysiloxane having a mass concentration of 1.5% under stirring, and then added with ammonium trifluoroacetate solution having a mass concentration of 1.5% dropwise until completely gelating to obtain a metal aerogel precursor;

(2) etching: the metal aerogel precursor was added in a hydrochloric acid replacement solution having a mass concentration of 4%, and replaced at a replacement temperature of 40° C. for 13 h to obtain a gel;

(3) washing: the gel obtained in step (2) was washed with deionized water to obtained a neutral gel;

(4) replacement: the neutral gel obtained in step (3) was soaked in ethanol containing 2% PVB for 7 h;

(5) pouring: the gel obtained in step (4) was dispersed evenly, and poured into a substrate having a honeycomb structure, and aged for 8 h to obtain a modified panel;

(6) drying: the modified panel obtained in step (5) was dried at 80° C. under a supercritical pressure of 10 MPa for 9 h, in which the carbon dioxide flow rate was 0.8 L/h; and (7) aging: the honeycomb panel obtained in step (6) was transferred to a vacuum composite system, and aged at room temperature under an absolute vacuum degree of 0.05 MPa for 15 h to obtain the vacuum panel.

Example 5

A preparation method of a thermally insulating aerogel vacuum composite panel included the following steps:

(1) preparation of an aerogel precursor: 1000 g TEOS solution having a mass concentration of 25% and 200 g nano tin particles were mixed, then added with 100 g polysiloxane having a mass concentration of 3% under stirring, and then added with ammonium trifluoroacetate solution having a mass concentration of 2% dropwise until completely gelating to obtain a metal aerogel precursor;

(2) etching: the metal aerogel precursor was added in sulphuric acid replacement solution having a mass concentration of 3%, and replaced at a replacement temperature of 45° C. for 5 h to obtain a gel;

(3) washing: the gel obtained in step (2) was washed with deionized water to obtained a neutral gel;

(4) replacement: the neutral gel obtained in step (3) was soaked in N-butanol containing 5% rosin modified alcohol resin for 8 h;

(5) pouring: the gel obtained in step (4) was evenly dispersed, and poured into a substrate having honeycomb structure, and aged for 7 h to obtain a modified panel;

(6) drying: the modified panel obtained in step (5) was dried at 90° C. under a supercritical pressure of 11 MPa for 6 h, in which the carbon dioxide flow rate was 0.5 L/h; and (7) aging: the honeycomb panel obtained in step (6) was transferred to a vacuum composite system, and aged at room temperature under an absolute vacuum degree of 0.04 MPa for 20 h to obtain the vacuum panel.

Example 6

A preparation method of a thermally insulating aerogel vacuum composite panel included the following steps:

(1) preparation of an aerogel precursor: 1000 g TEOS solution having a mass concentration of 45% and 400 g nano tin oxide particles were mixed, then added with 50 g polysiloxane having a mass concentration of 2% under stirring, and then added with ammonium trifluoroacetate solution having a mass concentration of 3% until 1 completely gelating to obtain a metal aerogel precursor;

(2) etching: the metal aerogel precursor was added in nitric acid replacement solution with a mass concentration of 3%, and replaced at a replacement temperature of 60° C. for 2 h to obtain a gel;

(3) washing: the gel obtained in step (2) was washed with deionized water to obtained a neutral gel;

(4) replacement: the neutral gel obtained in step (3) was soaked in ethanol containing 4% PVB for 5 h;

(5) pouring: the gel obtained in step (4) was evenly dispersed, and poured into a substrate having honeycomb structure, and aged for 6 h to obtain a modified panel;

(6) drying: the modified panel obtained in step (5) was dried at 100° C. under a supercritical pressure of 12 MPa for 5 h, in which the carbon dioxide flow rate was 0.2 L/h; and (7) the honeycomb panel obtained in step (6) was transferred to a vacuum composite system, and aged at room temperature under an absolute vacuum degree of 0.02 MPa for 20 h to obtain the vacuum panel.

Example 7

The difference of Example 7 from Example 3 is that the modified panel obtained in step (5) was soaked and replaced in an ethanol solution of PVB having a mass concentration of 20% for 24 hours, and then was dried in step (6). The other steps and process parameters are the same as those in Example 3.

Example 8

The difference of Example 8 from Example 3 is that the modified panel obtained in step (5) was soaked and replaced in an acetone solution of PVB having a mass concentration of 60% for 72 hours to obtain the replacement modified panel, and then was dried in step (6). The other steps and process parameters are the same as those in Example 3.

Example 9

The difference of Example 9 from Example 3 is that the modified panel obtained in step (5) was soaked and replaced in an ethanol solution of thermoplastic resin having a mass concentration of 10% for 12 h, and then was dried in step (6). The other steps and process parameters are the same as those in Example 3.

Example 10

The difference of Example 10 from Example 3 is that the modified panel obtained in step (5) was soaked and replaced in an isopropanol solution of rosin modified alcohol resin having a mass concentration of 40% for 60 h, and then was dried in step (6). The other steps and process parameters are the same as those in Example 3.

Example 11

The difference of Example 11 from Example 7 is that the modified panel obtained in step (5) was soaked and replaced in an ethanol solution of PVB having a mass concentration of 20% for 24 h to obtain the replacement modified panel, and then the replacement modified panel was sprayed with deionized water for replacement until a white film appeared on the surface of the modified panel to obtain a white surface modified panel, which was dried in step (6). The other steps and process parameters are the same as those in Example 3.

Example 12

The difference of Example 12 from Example 11 is that the obtained white surface modified panel was soaked in an ethanol solution of PVB having a mass concentration of 15% and aged for 1 h, and then was dried in step (6). The other steps are the same as those in Example 11.

Example 13

The difference of Example 13 from Example 11 is that the obtained white surface modified panel was soaked in an ethanol solution of PVB having a mass concentration of 30% and was aged for 4 h, and then was dried in step (6). The other steps are the same as those in Example 11.

Example 14

The difference of Example 14 from example 11 is that the obtained white surface modified panel was soaked in an isopropanol solution of PVB having a mass concentration of 20% and was aged for 2 h, and then was dried in step (6). The other steps are the same as those in Example 11.

Comparison Example 1

The difference of Comparison Example 1 from Example 3 is that, the aerogel composite panel obtained from Example 1 of China patent publication No. CN108940139A was used.

Comparison Example 2 the difference of Comparison Example 2 from example 3 is that, in step (4): the neutral gel obtained from step (3) was added into ethanol solution and soaked for 6 h. The other steps are the same as those of Example 3.

Comparison Example 3

The difference of Comparison Example 3 from example 3 is that, the mass concentration of TEOS solution in step (1) was 15%. The other steps are the same as those in Example 3.

Comparison Example 4

The difference of Comparison Example 4 from Example 3 is that, in step (1), 450 g nano alumina particle was used. The other steps are the same as those in Example 3.

Comparison Example 5

The difference of Comparison Example 5 from example 3 is that, in step (1), 150 g nano alumina particle was used. The other steps are the same as those in Example 3.

Comparison Example 6

The difference of Comparison Example 6 from example 3 is that, the temperature of the replacement solution in step (2) was 65° C. The other steps are the same as those in Example 3.

Comparison Example 7

The difference of Comparison Example 7 from example 3 is that, without step (3), the gel obtained by step (2) was not washed with ionic water. The other steps are the same as that of Example 3.

Performance Test

The thermal conductivity, compression strength and heat-resistance temperature of the vacuum composite panel obtained from Examples 1-14 and Comparison Examples 1-7 were measured at a thickness of 10 mm, in which the thermal conductivity was measured according to GB/T10295-2008, Thermal insulation-Determination of steady-state thermal resistance and related properties-Heat flow meter apparatus, the compressive strength was measured according to GB/T8813-2008, Rigid cellular plastics-Determination of compression properties, and the heat-resistant temperature was measured according to GB/T5988-2007, Refractory products—Determination of permanent change in dimension on heating. The visible light transmittance, infrared transmittance and visible light reflectance were measured according to GB/T2680-1994, Determination of light transmittance, solar direct transmittance, total solar energy transmittance and ultraviolet transmittance for glass in building and related glazing factors. The results are shown in Table 1.

TABLE 1

Performance test results of vacuum composite panel

| Item | Thermal conductivity w/(mk) | Compressive strength MPa | Heat resistant temperature ° C. | Visible light transmittance % | Infrared transmittance % | Visible light reflectance % |
| --- | --- | --- | --- | --- | --- | --- |
| Example 1 | 0.003 | 3.8 | 175 | 91 | 4 | 6.4 |
| Example 2 | 0.002 | 4.0 | 170 | 92 | 4 | 6.4 |
| Example 3 | 0.002 | 4.0 | 180 | 91 | 3 | 6.5 |
| Example 4 | 0.002 | 3.5 | 160 | 91 | 3 | 6.5 |
| Example 5 | 0.003 | 3.7 | 160 | 92 | 4 | 6.3 |
| Example 6 | 0.002 | 4.1 | 170 | 91 | 3 | 6.4 |
| Example 7 | 0.0006 | 4.0 | 200 | 93 | 2 | 6.1 |
| Example 8 | 0.0008 | 4.1 | 195 | 93 | 2 | 6.0 |
| Example 9 | 0.0007 | 4.0 | 200 | 93 | 2 | 6.0 |
| Example 10 | 0.0008 | 3.9 | 200 | 93 | 2 | 6.1 |

TABLE 1-continued

Performance test results of vacuum composite panel

| Item | Thermal conductivity w/(mk) | Compressive strength MPa | Heat resistant temperature ° C. | Visible light transmittance % | Infrared transmittance % | Visible light reflectance % |
|---|---|---|---|---|---|---|
| Example 11 | 0.0005 | 3.8 | 205 | 94 | 2 | 5.5 |
| Example 12 | 0.0004 | 3.8 | 205 | 93 | 1 | 6.0 |
| Example 13 | 0.0002 | 4.2 | 210 | 94 | 1 | 5.0 |
| Example 14 | 0.0003 | 4.1 | 210 | 93 | 1 | 5.5 |
| Comparison Example 1 | 0.025 | 2.5 | 120 | 66 | 14 | 11.8 |
| Comparison Example 2 | 0.008 | 3.0 | 135 | 85 | 8 | 9.5 |
| Comparison Example 3 | 0.007 | 2.9 | 150 | 80 | 7 | 9.5 |
| Comparison Example 4 | 0.010 | 2.6 | 140 | 82 | 10 | 9.7 |
| Comparison Example 5 | 0.009 | 3.2 | 145 | 83 | 8 | 9.3 |
| Comparison Example 6 | 0.008 | 3.1 | 140 | 81 | 8 | 9.8 |
| Comparison Example 7 | 0.005 | 3.3 | 160 | 87 | 6 | 8.1 |

It can be seen from Table 1 that, the thermal conductivity of the vacuum composite panel obtained by the preparation methods of Examples 1-14 of the present application is far lower than that of the composite panel obtained in Comparison Example 1. Since a lower thermal conductivity denotes a better heat-insulation performance, it indicates that the preparation method of the present application can effectively improve the heat-insulation performance of the vacuum composite panel. The visible light transmittance of the vacuum composite panels obtained in Examples 1-14 of the present application is more than 90%, indicating that the vacuum composite panel obtained in the present application has good light transmission performance and less reflection loss. In addition, the infrared transmittance of the present application is less than 5%. Because infrared is an important parameter causing temperature change, a lower infrared transmittance leads to better heat-insulation performance.

In the present application, compared with the Example 3, Examples 7-10 can effectively support the honeycomb pores in the metal aerogel when the modified casting board is soaked in the organic resin solvent, thereby reducing the number of collapsed honeycomb pores in the metal aerogel, and in turn further reducing the thermal conductivity of the vacuum composite panel and improving the heat-insulation performance of the metal aerogel.

Compared with Example 7, the thermal conductivity of Example 11, after surface extraction of the replacement modified panel, is lower than that in Example 7, so its heat-insulation performance is improved compared with Example 7. The reason is that the white adhesive film generated on the surface of the replacement-modified panel prevents the organic resin from flowing out of the honeycomb pores, thereby reducing the number of collapsed honeycomb pores in later drying process, maintaining the porosity of honeycomb pores and improving the heat-insulation performance.

Compared with Example 11, the thermal conductivity of the Examples 12-14 is further reduced compared with that of the Example 11, indicating that, when white surface modified panel, after extraction, is soaked in organic solvent again, it will provide further support to the honeycomb pores in the metal aerogel, reducing the number of collapsed honeycomb pores in later drying process, and ensuring the thermal insulation property of the composite panels. At the same time, it can also reduce infrared transmittance.

Compared with the Example 3, in Comparison Example 2, when the neutral gel is directly added to the ethanol solution, the thermal conductivity of the neutral gel is obviously higher than that of the Example 3. The main reason is that the number of collapsed honeycomb pores in later stage is increased, resulting in decrease of the heat-insulation performance of the vacuum panel, the decrease of visible light transmittance and the reduction of compressive strength.

Compared with the Example 3, when the mass solubility of the TEOS solution is lower than the range specified in the present application, the effective component content in the TEOS solution is reduced. When the metal content is the same, the pore size of the honeycomb pores in the metal aerogel is also relatively increased during the etching process, resulting in the increase of the heat conduction coefficient and the decrease of the heat-insulation performance. At the same time, the compressive strength of the vacuum composite panel will decrease with the increase of pore size.

Compared with the Example 3, in Comparison Examples 4-5, when the content of the metal particle is relatively high, more honeycomb pores or larger honeycomb pores will be formed during a later stage of the metal aerogel etching, resulting in thermal convection, increased thermal conductivity, lowered heat-insulation performance, and increased formation of larger honeycomb pores, which will reduce the compressive strength of the vacuum composite panel.

Compared with the Example 3, in Comparison Example 6, the reaction speed will also increase when the temperature of the replacement solution increases. Some reactant will be kept in the hole to block the honeycomb pores, resulting in the termination of the reaction, rather than forming honeycomb pores. In addition, when the displacement fluid temperature exceeds the ranger specified in this application, there will also be a situation in which the metal aerogel is expanded to destroy formed honeycomb pores. This will also lead to the increase of the thermal conductivity of the composite panel, the decrease of the transparency of the vacuum composite panel and the decrease of the visible light transmittance.

Compared with the Example 3, in Comparison Example 7, the metal aerogel is not washed ionic water, therefore, the residual acid in the metal aerogel honeycomb pore can continue to react with the metal particles, so that the pore size of the honeycomb pore will also increase correspondingly, and the heat-insulation performance will decrease.

The examples of this specific embodiment are the preferred examples of the present application and do not limit the protection scope of the present application. Therefore, all equivalent changes made according to the structure, shape and principle of the present application should be covered by the protection scope of the present application.

What is claimed is:

1. A preparation method of a thermally insulating aerogel vacuum composite panel, comprising the following steps:
   (1) mixing tetraethyl orthosilicate (TEOS) solution having a mass concentration of 20-50% and a metal particle by a weight ratio of 100:(20-40), adding a hydrophobic agent having a mass concentration of 0.1-3%, mixing, and adding ammonium trifluoroacetate solution having a mass concentration of 0.1-5% dropwise until completely gelating to obtain a metal aerogel precursor, wherein a weight ratio of the TEOS solution to the hydrophobic agent is 100:(1-30);
   (2) adding the metal aerogel precursor into an acid replacement solution with a mass concentration of 3-10% for replacement to obtain a gel, with a replacement temperature of 30-60° C. and a replacement time of 1-24 h;
   (3) washing the gel obtained in step (2) with deionized water to obtain a neutral gel;
   (4) soaking the neutral gel obtained in step (3) in a first organic resin solvent having a mass concentration of 0.1-5% for 4-8 h;
   (5) homogenizing the gel obtained in step (4), pouring into a substrate with honeycomb structure, and aging for 4-8 h to obtain a modified panel;
   (6) drying the modified panel obtained in step (5) to obtain a honeycomb panel; and
   (7) aging the honeycomb panel obtained in step (6) at room temperature for 1-24 h under an absolute vacuum of 0.01-0.05 MPa;
   wherein the modified panel obtained in step (5) is soaked in a second organic resin solvent having a mass concentration of 10-60%, replaced for 12-72 h, and dried;
   wherein the modified panel obtained after replacing is sprayed with the deionized water until a white film appears on a surface of the modified panel to obtain a white surface modified panel.

2. The preparation method according to claim 1, wherein the white surface modified panel is soaked in a third organic resin solvent having a mass concentration of 15-30%, aged for 1-4 h, and dried in step (6).

3. The preparation method according to claim 2, wherein a first organic resin of the first organic resin solvent, a second organic resin of the second organic resin solvent and a third organic resin of the third organic resin solvent is one selected from a group consisting of polyvinyl butyral (PVB) and rosin modified alkyd resin; and a solvent of the first organic resin solvent, a solvent of the second organic resin solvent, and a solvent of the third organic resin solvent is one selected from a group consisting of ethanol, ethyl acetate, isopropanol and acetone.

4. The preparation method according to claim 1, wherein the metal particle in step (1) is one selected from a group consisting of nano aluminum particle, nano alumina particle, nano iron particle, nano iron oxide particle, nano tin particle and nano tin oxide particle.

5. The preparation method according to claim 1, wherein the hydrophobic agent in step (1) is one selected from a group consisting of polysiloxane and polysilazane.

6. The preparation method according to claim 1, wherein an acid of the acid replacement solution in step (2) is one selected from a group consisting of trifluoroacetic acid, hydrofluoric acid, acetic acid, sulfuric acid, nitric acid and hydrochloric acid.

7. The preparation method according to claim 1, wherein in step (6), the modified panel is dried by supercritical drying under a supercritical pressure of 5-12 MPa at a drying temperature of 30-100° C. for 5-24 h, with a carbon dioxide flow of 0.2-2 L/h.

* * * * *